Figure 1:
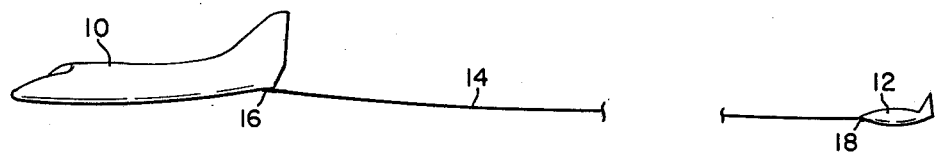

Oct. 16, 1962     B. C. MADDEN, JR     3,058,692

TOWLINE

Filed June 15, 1960

PRIOR ART TOW CABLE

INVENTOR.
BAXTER C. MADDEN JR.
BY
*George J. Rubens*
ATTORNEY

3,058,692
TOWLINE

Baxter C. Madden, Jr., 680 N. Loop Drive, Camarillo, Calif.
Filed June 15, 1960, Ser. No. 36,456
1 Claim. (Cl. 244—3)
(Granted under Title 35, U.S. Code (1952), sec. 266)

The invention described herein may be manufactured and used by or for the Goverenment of the United States of America for governmental purposes without the payment of any royalties thereon or therefor.

The present invention relates to a towline and more particularly to a towline which will cause a minimum amount of drag when it is used to tow an object through a fluid.

With the advent of supersonic flight it has become necessary, for weapon evaluation testing and training purposes, to provide aerial targets which will travel at supersonic speeds. A drone target is one type of supersonic target but because of the high cost of a supersonic drone it is evident that destruction of such targets results in extremely costly operations and prohibits an adequate training program. Another way of providing an aerial target is to tow the target by a tractor aircraft with a towline. In order to provide an adequate arrangement for towing a target at supersonic speeds two requirements must be met, namely: (1) the target must trail a safe distance behind the tractor aircraft for the protection of the crew of the tractor, and (2) the drag due to the towline must be minimized. A length of 40,000 feet is typical of a safe trailing distance of the target behind the tractor aircraft for certain missions, but presently existing towlines of such a length cause a drag which seriously impairs the performance of the system. The present invention has overcome the problem of undue drag of the towline by providing a towline which is uniformly tapered. The degree of taper on the towline is to be such that upon towing an aerial target the stress on the towline is substantially the same at any cross-section along the towline. Accordingly, the small cross-sectional end of the towline will be attached to the aerial target and the large cross-sectional end will be attached to the tractor aircraft. Thus, as the force on the towline decreases upon approaching the aerial target so does the cross-section of the towline decrease, thereby eliminating the surplus cross-section of the towline behind the towing aircraft and reducing the drag of the towline to a minimum.

An object of the present invention is to provide a towing device which will present a minimum amount of drag.

A further object is to provide a towline which when used to tow an object will have substantially the same stress at any cross-section along its length.

Figure 2:
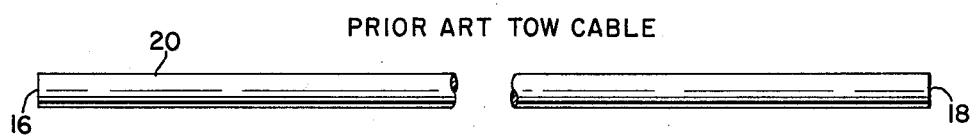
Figure 3:
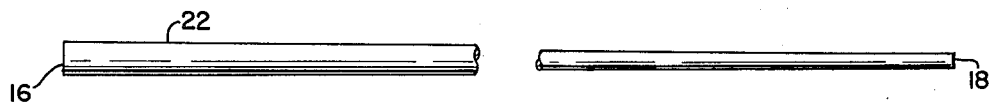
Figure 4:
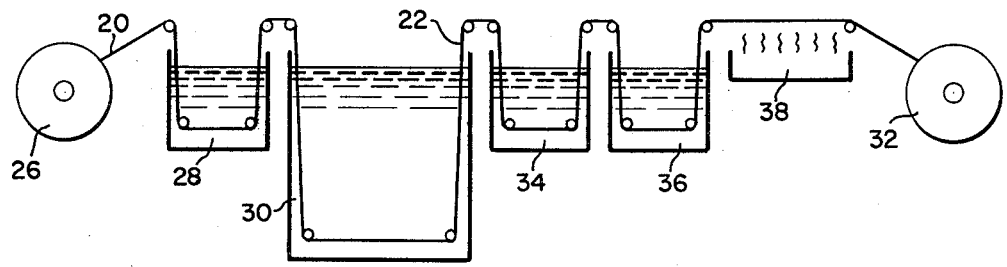

Other objects and many of the attendant advantages of this invention will be readily appreciated as the same become better understood by reference to the following detailed description when considered in connection with the accompanying drawings wherein:

FIG. 1 is a side view of an airplane towing an aerial target.
FIG. 2 is a side view of a prior art towline.
FIG. 3 is a side view of the presently invented towline.
FIG. 4 is a diagrammatic view of a process for producing the invented towline.

Referring now to the drawings, wherein like reference numerals designate like or corresponding parts throughout the several views, there is shown in FIG. 1 a tractor aircraft 10 towing an aerial target 12 with a towline 14. It is intended that the tractor aircraft 10 include manned and unmanned aircraft, drones and guided missiles such as a recoverable Regulus I or a recoverable Regulus II. It is readily apparent that upon towing the aerial target 12 the drag force on the towline 14 is greater at a leading end 16 of the towline than it is at a trailing end 18 of the towline since the towline itself adds to the drag force. Assuming that the towline 14 is a uniform cross-section towline 20, as shown in FIG. 2 it follows that the stress on the towline 20 decreases as the trailing end 18 is approached. This means that if the leading end 16 of the towline 20 is properly designed to withstand the drag force, a part of the remainder of the towline behind the leading end 16 is surplus, the surplus increasing as the trailing end 18 is approached. The present invention is the provision of a uniformly tapered towline 22 from which is absent the surplus found in the towline 20 so that the stress along the towline 22 is substantially the same. By removing the surplus the drag on the towline 14 and the weight of the towline itself is lessened so that greater speeds can be obtained and/or a longer towline can be used for a given thrust of the tractor propulsion system. It is to be noted, of course, that the degree of taper of the towline 22 will depend upon variables such as the speed desired and the altitude to be flown.

A process that can be used for making the towline 22 is shown in FIG. 4 wherein the uniform diameter line 20 is unwound from a drum 26 at a varying rate into a degreasing tank 28 after which it passes into a tank 30 having a suitable etchant. A driving drum 32 in conjunction with a variable speed motor (not shown) drives the line 20 through the etchant tank 30 at a variable rate so that a portion of the line 20 is etched, leaving a tapered towline 22 as it leaves the tank 30. After passing through the etchant tank 30, the tapered towline passes into a neutralizer tank 34, then into a rinse tank 36 after which it crosses a hot air dryer 38. The towline 22 is then wound on the drum 32 after which it can be placed in an oven (not shown) at 300° F. for several hours to reduce any hydrogen embrittlement and then run through an oil bath (not shown).

Thus, it is now readily apparent that the present invention provides a new and novel type of towline which will enable towing at greater speeds and/or with a longer towline length. Accordingly, the present invention has enabled the art of towing targets to keep pace with the increased speeds of present-day aircraft and at the same time has afforded safety to a crew of the tractor aircraft 10 by allowing a longer towline to be employed.

Obviously many modifications and variations of the present invention are possible in the light of the above teachings. For instance, the present invention is applicable to tows within fluids other than air such as towing an object in water. It is therefore to be understood that within the scope of the appended claim, the invention may be practiced otherwise than as specifically described.

I claim:

A combination for towing an aerial target comprising a tractor aircraft connected to a leading end of a towline and the aerial target connected to a trailing end of the towline, said towline being uniformly tapered and of a monofilament construction with its leading end being of a greater cross-section than its trailing end whereby upon towing the aerial target the drag of the towline is kept to a minimum.

References Cited in the file of this patent

UNITED STATES PATENTS

| | | |
|---|---|---|
| 2,093,443 | Heintz | Sept. 21, 1937 |
| 2,463,590 | Arutunoff | Mar. 8, 1949 |
| 2,848,179 | Troxell et al. | Aug. 19, 1958 |

OTHER REFERENCES

Marks' Mechanical Engineers Handbook, pages 11—84 and 11—85, Theodore Baumerster 6th edition, copyright 1958, McGraw-Hill Book Co.